United States Patent
Watabe

[19]

[11] Patent Number: 6,130,871
[45] Date of Patent: Oct. 10, 2000

[54] OPTICAL DISK APPARATUS AND OPTICAL DISK

[75] Inventor: Kazuo Watabe, Kawasaki, Japan

[73] Assignee: Kabushiki Kaisha Toshiba, Kawasaki, Japan

[21] Appl. No.: 09/047,226

[22] Filed: Mar. 25, 1998

[30]   Foreign Application Priority Data

Mar. 26, 1997 [JP]   Japan ..................................... 9-073437

[51] Int. Cl.$^7$ ........................................................ G11B 7/00
[52] U.S. Cl. .................................. 369/59; 369/58; 369/48
[58] Field of Search ................................. 369/59, 47, 48, 369/58, 275.1, 275.4, 276, 100

[56]   References Cited

FOREIGN PATENT DOCUMENTS

| | | |
|---|---|---|
| 553541A1 | 8/1993 | European Pat. Off. . |
| 580873A1 | 2/1994 | European Pat. Off. . |
| 664541A1 | 7/1995 | European Pat. Off. . |
| 6-176404 | 6/1994 | Japan . |

OTHER PUBLICATIONS

JP–A–1017223–abstract from Patent Abstracts of Japan.
JP–A–2281816–abstract from Patent Abstracts of Japan.

*Primary Examiner*—Muhammad Edun
*Attorney, Agent, or Firm*—Pillsbury Madison & Sutro LLP

[57]   ABSTRACT

An optical disk apparatus comprising an optical disk on which pits corresponding to data bits are arranged in a track tangential direction, a motor drive unit for rotating the optical disk, and a reproducing unit for reproducing the pits, wherein the length PL of each of the pits is set at such a value as to satisfy a condition of following equation $$0.55 \leq (f_T \cdot PL)/(n \cdot Sr1) \leq 1.50$$

where the scanning linear velocity at which the disk is rotated by the motor drive unit when the reproducing unit reproduces the pits recorded in a radius r1 of the disk is set to Sr1 [m/s], a preset channel bit rate in the radius r1 of the optical disk is set to $f_T$ [b/s], the pits correspond to data recorded in correspondence to the n-channel bit length, and the pit length in the track tangential direction is set to PL [m].

21 Claims, 7 Drawing Sheets

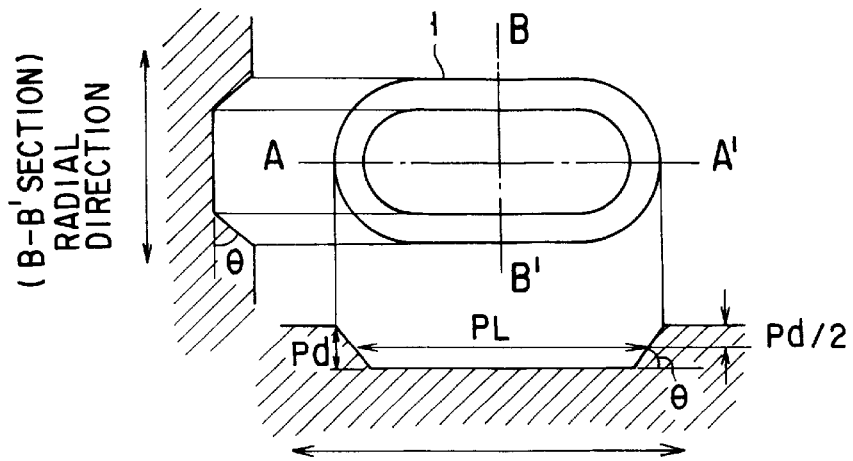
FIG. 3  TRACK TANGENTIAL DIRECTION (A–A' SECTION)
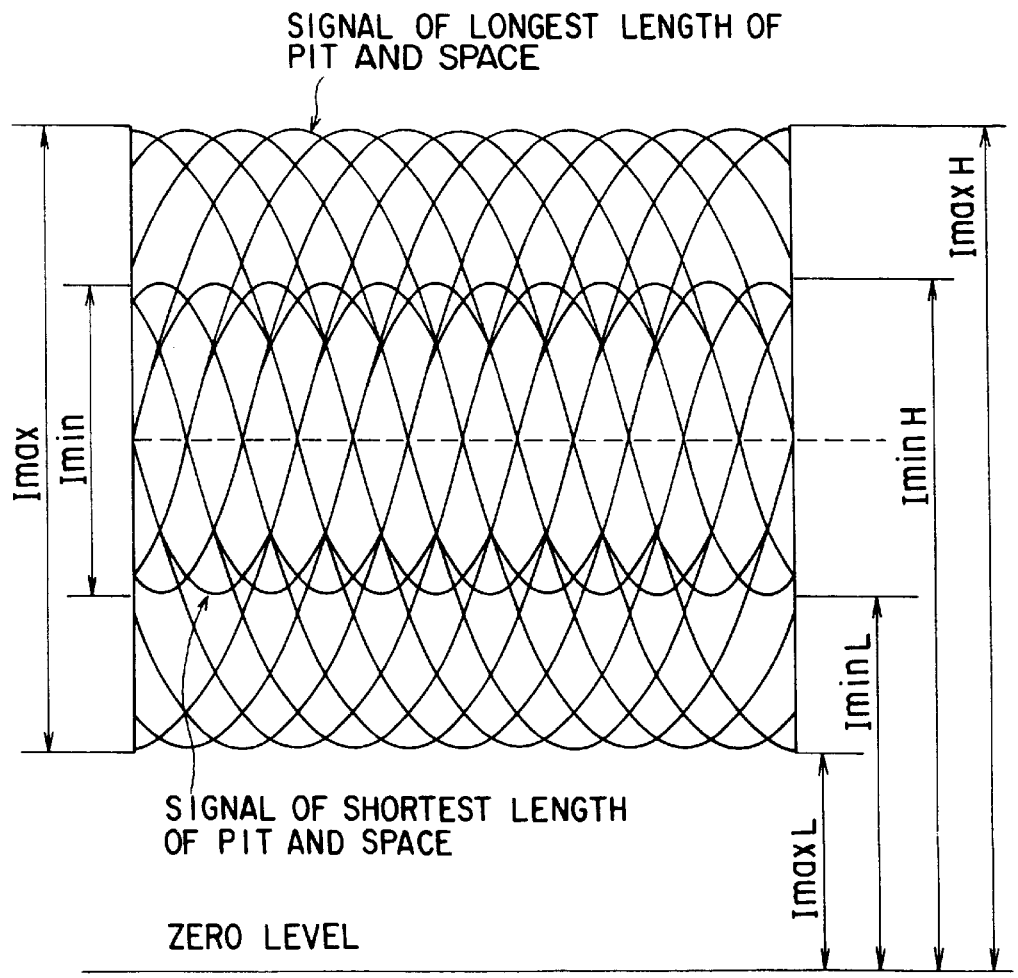
FIG. 5

OPTICAL DISK APPARATUS AND OPTICAL DISK

BACKGROUND OF THE INVENTION

This invention relates to an optical disk apparatus which utilizes an optical disk as a recording medium, and more particularly to an optical disk apparatus using an optical disk on part or an entire portion of which pits corresponding to data bits are previously recorded, for reproducing a data stream constructed by the pits by use of an optical head.

Conventionally, as a high-density recording system of particularly a rewritable optical disk apparatus, a land/groove recording system is provided (for example, refer to Jpn. Pat. Appln. KOKOKU Publication No. 63-57859). The system is a system for recording marks, for example, phase-change marks on both of the land and groove and can make the recording density higher in comparison with a system for recording marks only on one of the land and groove.

In the rewritable optical disk apparatus, control information such as address data and a rotation control signal and other than rewritable data (user data and so on) in the case of hard format is generally previously recorded on the header field in the form of pre-pits. An area on which rewritable data is recorded is called a recording field for convenience to distinguish the recording field from the header field.

In the recording system for recording information only on one of the land and groove, the header field is provided only on the track of the land or groove. On the other hand, in the land/groove recording system, the header fields are provided on both of the tracks of the land and groove. However, if pits are provided for each track in the header field, crosstalk occurs due to the presence of the pits on the adjacent track when information is reproduced from the header field, thereby making it difficult to reproduce information in some cases.

There is provided a land/groove recording system in which the pre-pit pattern of the header field is arranged by shifting a predetermined length in right and left with respect to the center of the track so that the pre-pit pattern is common to the land and groove. When this system is used, the influence of crosstalk from the adjacent track can be reduced since the track pitch of pre-pits in the header field becomes twice that in the recording field. In this case, a reproduction system using a differential output signal (push-pull signal) from a two-segment split photo-detector can be effectively used. Further, the off-track amount of the light beam spot can be detected by comparing the reproduced signal amplitudes of the pre-pit strings wobbled on the right and left sides.

In the optical disk apparatus, since information such as address IDs are recorded on the header field, a reproduction signal of high quality is required. As the parameter for characterizing the signal quality, the modulation amplitude and asymmetry value of the reproduced signal of the header field are generally specified in the specification of the optical disk. However, it is assumed that the controllability of the symmetry in the eye-pattern of the reproduced signal based on the push-pull signal may depend on the cross section and the depth of a to-be-reproduced pit, but a clear standard is not specified. If the symmetry of the reproduced signal cannot be sufficiently controlled, the jitter of the reproduced signal becomes larger, thereby making it difficult to attain precise data reproduction.

BRIEF SUMMARY OF THE INVENTION

An object of this invention is to provide an optical disk apparatus capable of effecting the precise data reproduction of a header field by using a reproduction system for generating a push-pull signal obtained from a two-segment split photo-detector and specifying the structure of pits related to the symmetry control of a reproduction signal to attain the highly reliable symmetry control of the reproduction signal.

According to the present invention, there is provided an optical disk apparatus comprising an optical disk on which marks corresponding to data bits are arranged in a track tangential direction, a rotating unit for rotating the optical disk, and a reproducing unit for reproducing the marks, wherein the length PL of the marks is set at such a value as to satisfy a condition of the following equation:

$$0.55 \leq (f_T \cdot PL)/(n \cdot Sr1) \leq 1.50$$

where the scanning linear velocity at which the disk is rotated by the rotating unit when the reproducing unit reproduces the marks recorded in the radius r1 of the disk is set to Sr1 [m/s], a preset channel bit rate in the radius of the optical disk is set to $f_T$ [b/s], the marks correspond to data recorded in correspondence to the n-channel bit length, and the pit length in the track tangential direction is set to PL [m].

In other words, the present invention provides an optical disk apparatus in which marks corresponding to data bits are recorded on the optical disk, a format having pit strings wobbled on both sides of the track center line of the recording field is provided, and the condition for recording the pits as described below is set when the beam spot is tracking-controlled along the track center line of the recording field and the data are reproduced using a push-pull signal obtained from a two-segment split photo-detector, thereby making it possible to obtain a reproduction signal with proper symmetry. That is, if the scanning linear velocity when the optical disk is rotated in the reproducing operation is set to Sr1 [m/s], a preset channel bit rate at the scanning linear velocity is set to fT [b/s], and the pit length in the track tangential direction of a pit recorded in correspondence to the n-channel bit length is set to PL [m], then PL is set to satisfy the condition expressed by the following expression;

$$0.55 \leq (f_{nT} \cdot PL)/(n \cdot Sr1) \leq 1.50$$

In this case, the pit length PL is a pit length measured in the track tangential direction at the depth of pd/2 when the depth at the deepest portion of the pit is set to pd. Particularly, the pit length PL in the case of the signal of the shortest length of pit and space (for example, 3T pit and space signal in the case of 8–16 modulation used in DVD) is required to be precisely set so as to satisfy the above expression based on the relation with the asymmetry.

In the reproduction system based on the differential signal from the two-segment split photo-detector, a reproduction signal of proper symmetry can be obtained by recording a pre-pit pattern with the pit length PL on the header field of the optical disk. Therefore, information can be reproduced from the header field with high reliability.

Further, in this invention, there is provided an optical disk apparatus in which if the pit length in the track tangential direction at the depth of pd/2 is set to PLn [m] when the depth at the deepest portion of a pit which is recorded in the radius r1 of the optical disk and formed with a length corresponding to the code length nT in a preset modulation method is set to pd, a predetermined reproduction frequency of a $2_{nT}$-pitch signal in the radius r1 is $f_{nT}$ [1/s], and the scanning linear velocity of the optical disk in the radius r1 is set to Sr1 [m/s], the condition expressed by the following expression is satisfied:

$$PL=0.55 \leq (2 \cdot f_{nT} \cdot PLn)/Srl \leq 1.50$$

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a view for illustrating the pit structure associated with the embodiment of this invention;

FIG. 5 is a diagram for illustrating the definition of asymmetry of a reproduction signal waveform;

DETAILED DESCRIPTION OF THE INVENTION

There will now be described an embodiment of this invention with reference to the accompanying drawings.

Figure 1:
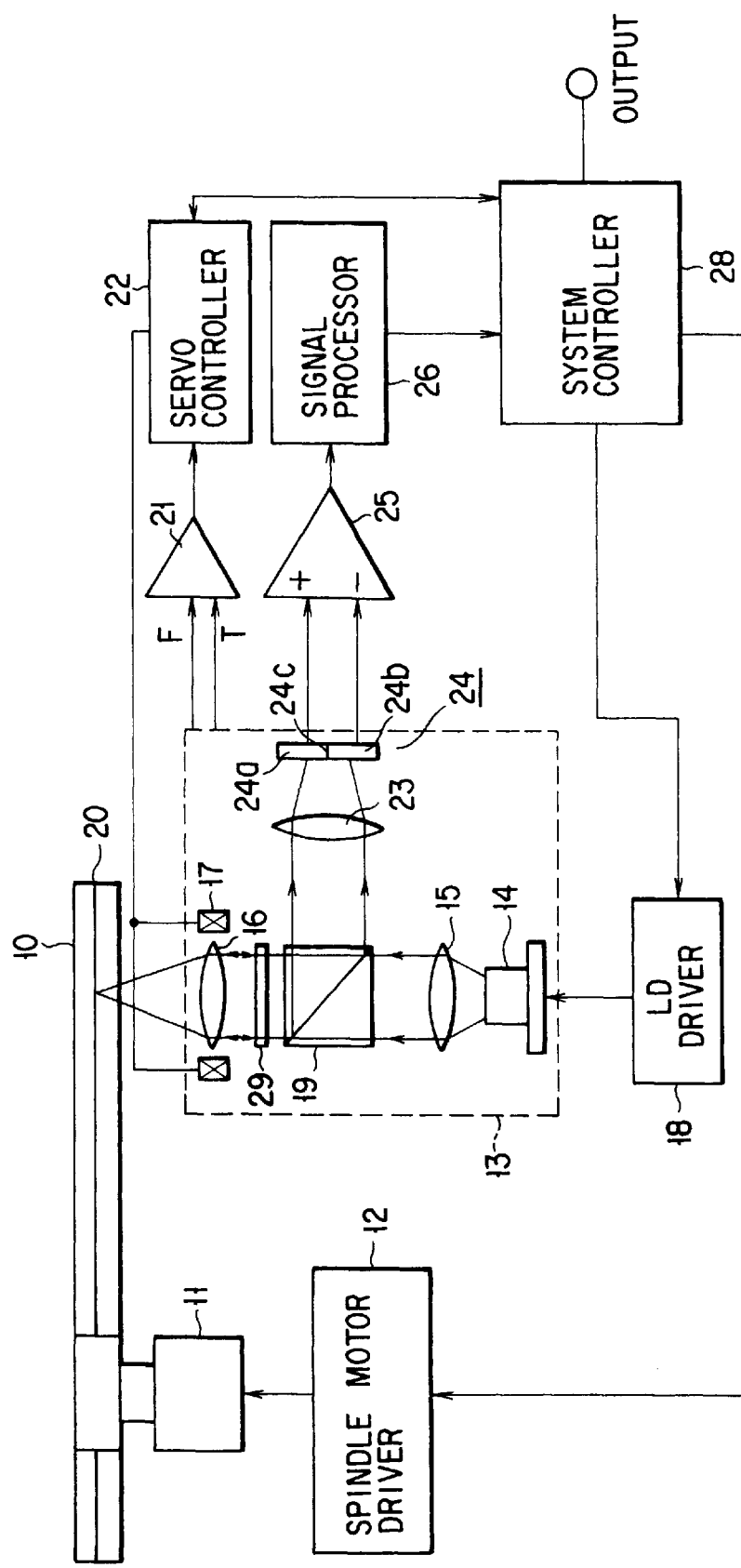
FIG. 1 is a block diagram showing the main portion of an optical disk apparatus according to one embodiment of this invention.

First, an optical disk apparatus according to an embodiment of this invention is explained with reference to FIG. 1.

Figure 2:
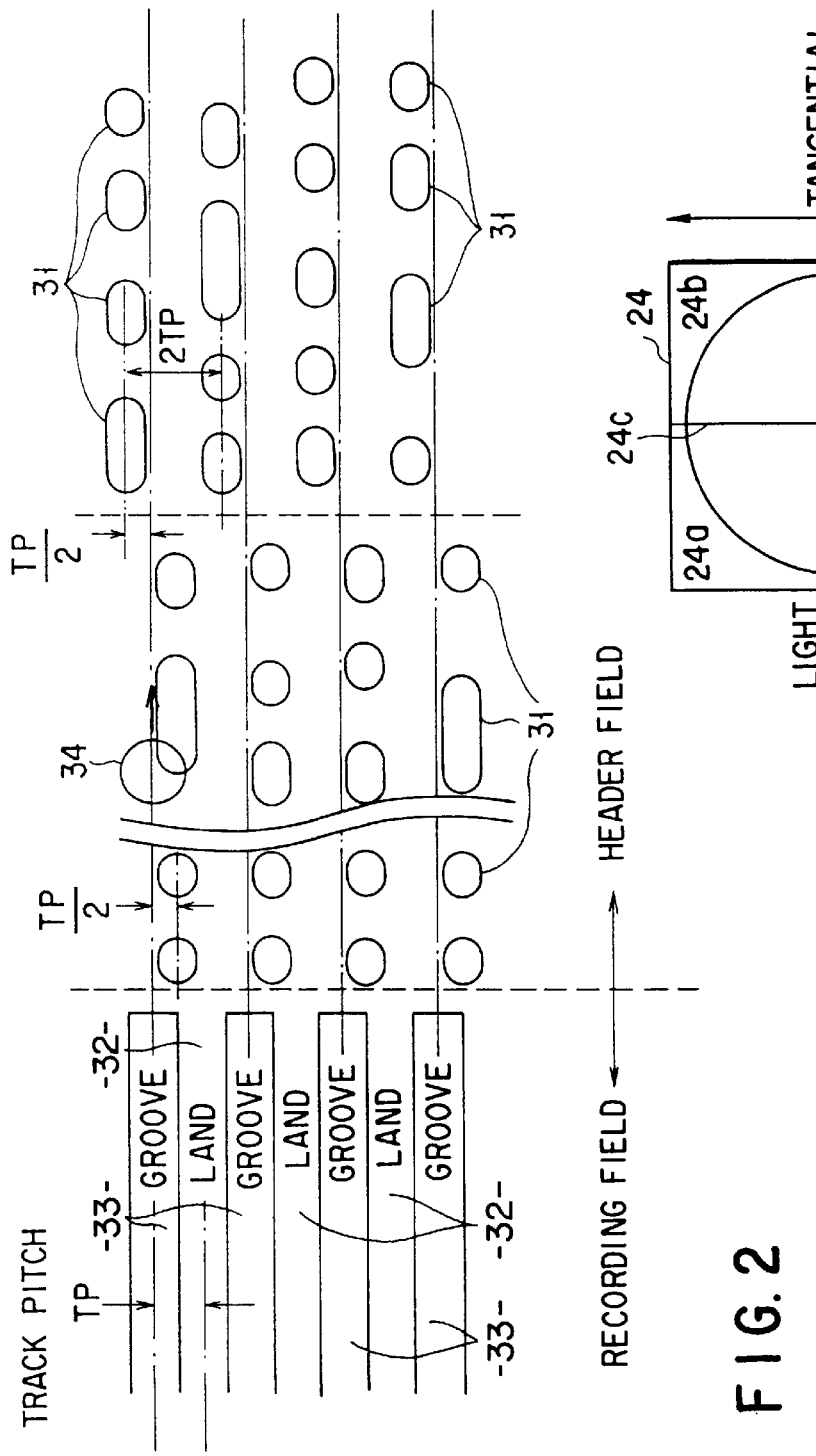
FIG. 2 is a diagram showing a pre-pit pattern recorded on the optical disk.

The optical disk apparatus is a rewritable optical disk apparatus using the land/groove recording system, and as shown in FIG. 2, it is assumed that an optical disk on which control information or the like is recorded in the form of pre-pit pattern (pre-pit array) in the header field is used.

The optical disk apparatus includes a spindle motor 11 for rotating an optical disk 10, a spindle motor driver 12 for driving the spindle motor 11, an optical head 13, a laser diode (LD) driver 18, an amplifier 21, a differential amplifier 25, a servo controller 22, a signal processor 26 and a system controller 28. On the recording surface 20 of the optical disk 10, a recording field and header field as shown in FIG. 2 are formed. In the header field, pits having such a structure as shown in FIG. 3 are recorded in a pre-pit string as will be described later.

The optical head 13 includes a semiconductor laser 14, collimator lens 15, objective lens 16, actuator 17, polarization beam splitter 19, $\lambda/4$ plate 29, condenser lens 23, and two-segment split photo-detector 24. The semiconductor laser 14 is driven by the LD driver 18 to emit a laser beam. The collimator lens 15 converts the laser beam from the semiconductor laser 14 into parallel light.

The parallel light passes through the polarized beam splitter 19 and the $\lambda/4$ plate 29, and is incident on the objective lens 16. Then, the objective lens 16 causes a light beam to be focused on the recording surface 20 of the optical disk 10. In this case, a signal indicating the amount of deviation of the light beam focused on the recording surface 20 from a target track in the radial direction and a signal indicating the amount of deviation of the light beam from the recording surface in the vertical direction are respectively output as a tracking error signal and focus error signal to the amplifier 21 by use of an optical/electrical system (not shown). The error signals amplified by the amplifier 21 are input to the servo controller 22. The servo controller 22 generates driving signals corresponding to the respective deviation amounts to drive and control the actuator 17 so as to change the position of the objective lens 16 and control the light beam spot to be applied to a target position. As shown in FIG. 2, the light beam spot is controlled to be set on the center of each of a land 32 and groove 33 in the recording field of the optical disk. Further, in the header field, the light beam is first held in a corresponding radius immediately before the header field is scanned and then it is controlled to scan a position at a distance from the center of pre-pits 31 by an amount corresponding to half the track pitch of the recording field.

Figure 4:
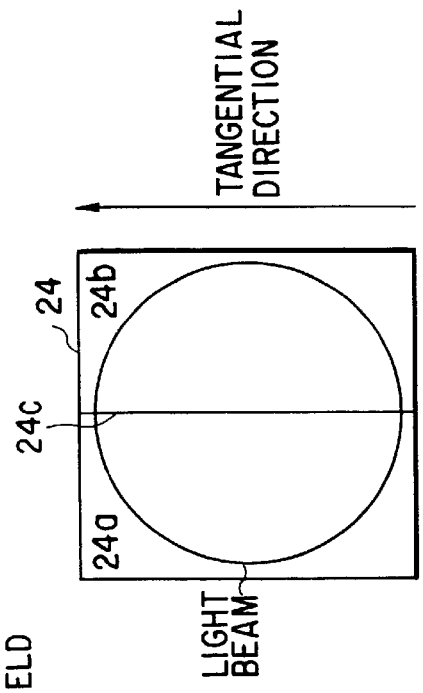
FIG. 4 is a plan view of a two-segment split photo-detector.

On the other hand, the light beam reflected from the optical disk 10 passes through the $\lambda/4$ plate 29 and is reflected by the polarization beam splitter 19 after passing through the objective lens 16 and is then made incident on the condenser lens 23. In this case, the light beam from the header field is converged on the two-segment split photo-detector 24 by the condenser lens 23. The two-segment split photo-detector 24 has two light receiving areas 24a and 24b divided with a separator 24c parallel to the track tangential direction on the optical disk set as the center as shown in FIG. 4. The two-segment split photo-detector 24 may be exclusively used for signal detection for the header field or may also be used for tracking error signal detection or RF signal detection. The differential amplifier 25 derives a difference signal (push-pull signal) based on output signals from the light receiving areas 24a and 24b and outputs the differential signal to the signal processor 26. The signal processor 26 effects the signal processing operation containing a preset demodulation process to generate a reproduction signal corresponding to the information recorded on the header field and output the same to the system controller 28.

As will be described later, the main point of this invention is to set the length (pit length PL) of the pit in the track tangential direction among the structural factors of the pit so that the value of asymmetry AS which specifies the signal quality of the reproduction signal can be set to a desired degree (refer to FIG. 3).

As a method for quantitatively evaluating the signal quality of the reproduction signal, a method for measuring the value of asymmetry AS which is an index indicating the degree of symmetry of the signal of the shortest length of pit and space and the signal of the longest length of pit and space of the pre-pit string is known.

FIG. 5 is a diagram for illustrating the definition of the asymmetry AS of a reproduction signal waveform. As shown in FIG. 5, the asymmetry AS can be expressed by the following equation (1) when the highest level and lowest level of a reproduction signal of the shortest length of pit and space (3T is the shortest length of pit and space in the case of 8–16 modulation used in DVD, for example) of a certain modulation system are respectively set to IminH and the highest level and lowest level of a reproduction signal of the signal of the longest length of pit and space (14T is the longest length of pit and space in the case of 8–16 modulation used in DVD, for example) are respectively set to ImaxH and ImaxL. In this case, "nT" indicates a time interval of n-channel bits.

$$AS=[(Imax\ H+Imax\ L)-(Imin\ H+Imin\ L)]/[2(Imax\ H-Imax\ L)] \quad (1)$$

In some specification, other equation can be used to express the asymmetry value but they are substantially equal except for their polarity.

Figure 6:
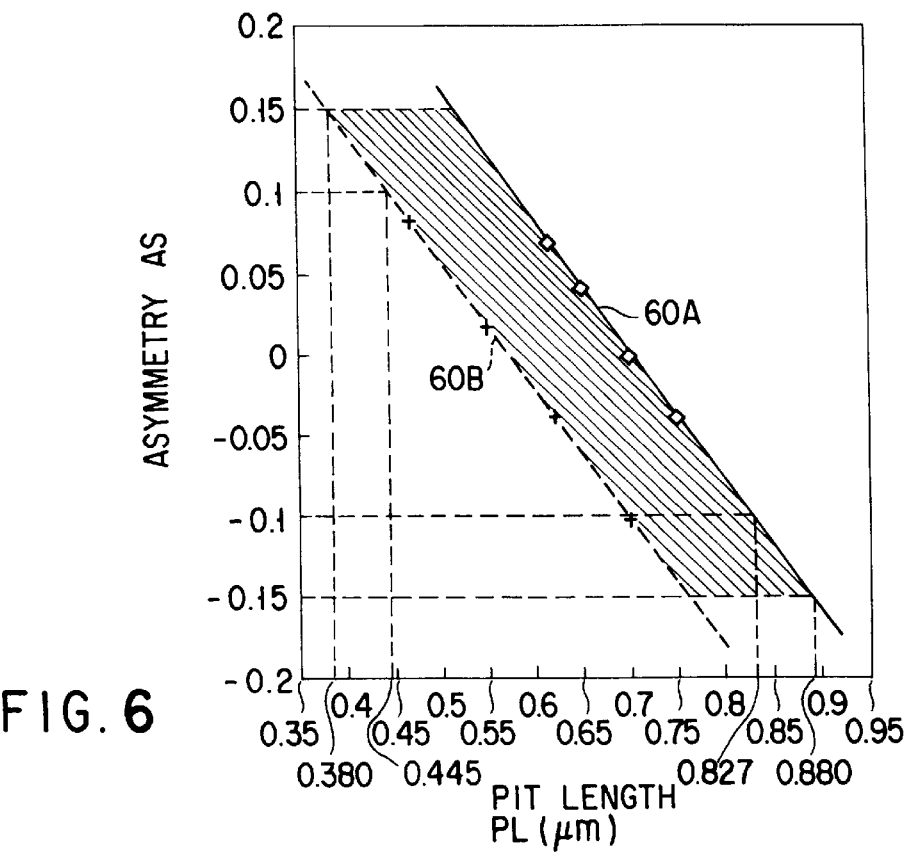
FIG. 6 is a characteristic diagram showing the relation between the asymmetry and the pit length associated with this embodiment.

As described before, as the important factor for determining the signal quality of a reproduction signal, it is particularly required to set the asymmetry AS in a preset specified range; and this requirement must be satisfied in order to obtain a reproduction signal of high quality. Specifically, the above specified range is preferably set to a range of –0.15 to 1.5 in the characteristic diagram shown in FIG. 6 when taking the margin of the physical characteristic of the optical disk and the manufacturing margin of the optical disk drive unit into consideration. FIG. 6 is a characteristic diagram showing the relation between the pit length PL and the value of asymmetry AS. That is, in the structure of the pre-pit 1 shown in FIG. 3, the pit length PL in the track tangential direction of the signal of the shortest length of pit and space is closely related to the value of asymmetry AS of a push-pull signal when the pre-pit 1 is reproduced by use of the optical head 13 and is approximately inversely proportional to the AS. In this case, as described before, the push-pull signal is a difference signal of the two-segment split photo-detector 24 obtained at the time of reproduction of the pit when the light beam spot 34 of the optical head 13 is focused on a position with a preset offset in the radial direction from the pit center (refer to FIG. 2).

Figure 8:
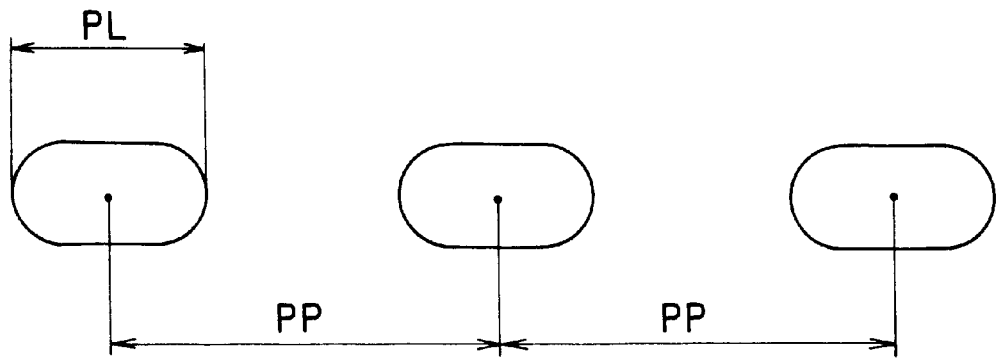
FIG. 8 is a diagram for illustrating a pit string associated with this embodiment.

FIG. 6 is a characteristic diagram of the value of asymmetry AS with respect to the pit length PL in the signal of the shortest length of pit and space in a case where the signal of the shortest length of pit and space is a cyclic signal having a pit pitch PP of 1.23 μm as shown in FIG. 8, the signal of the longest length of pit and space is a cyclic signal having a pit pitch PP of 5.74 μm as shown in FIG. 8, and the pit length in the signal of the longest length of pit and space is set at 2.87 μm in an optical system (optical head 13) in which the light source is 685 nm and the numerical aperture of the objective lens 16 is 0.6.

Figure 9:
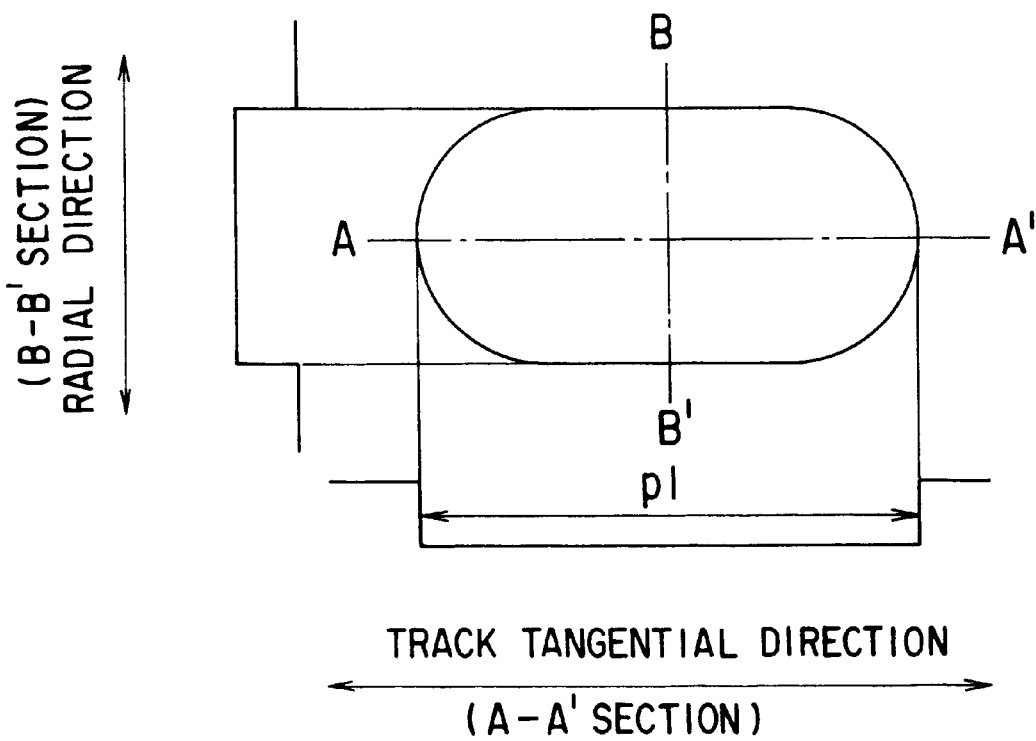
FIG. 9 is a view showing the structure of a pit having a rectangular cross section associated with this embodiment.

Further, as shown in FIG. 9, the characteristic curve 60A corresponds to the structure of the pit 1 having a rectangular cross section. The characteristic curve 60B corresponds to the structure of the pit 1 having a trapezoidal cross section and wall surface angles of approx. 30 degrees in both of the radial direction and track tangential direction as shown in FIG. 3. In this case, the pit depth pd is 90 nm. In this embodiment, the pit length PL is the length of the pit in the track tangential direction in position at the depth of "pd/2" which is half the pit depth pd.

Figure 7:
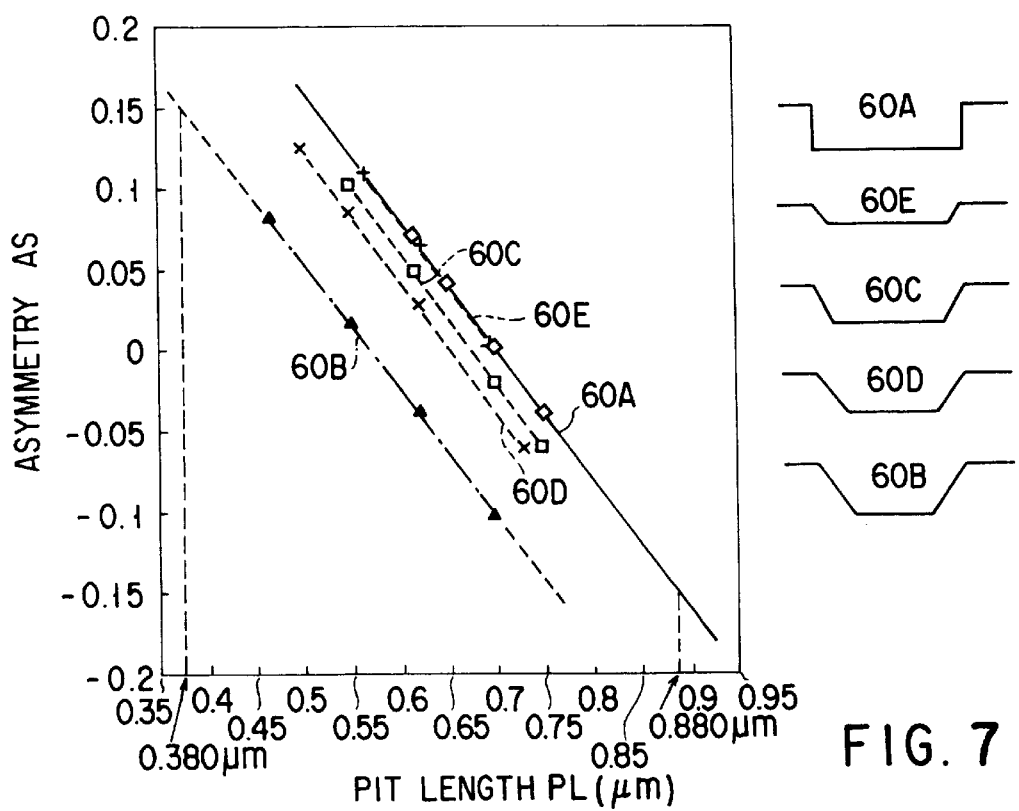
FIG. 7 is a characteristic diagram showing the relation between the asymmetry and the pit length associated with this embodiment.

In the pit having the rectangular cross section as shown in FIG. 8, it is confirmed that the characteristic curve 60B is not substantially changed even if the pit depth pd is changed from 90 nm by making the similar calculation although the result thereof is not shown. Further, FIG. 7 shows the characteristic curves 60B to 60E obtained when the wall surface angle θ and the pit depth pd are changed with respect to the characteristic curve 60A obtained in a case where the pit has the rectangular cross section. In this case, the characteristic curve 60B shows a case wherein the wall surface angle θ is approx. 30 degrees and the pit depth pd is 90 nm. Likewise, the characteristic curve 60C shows a case wherein the wall surface angle θ is approx. 45 degrees and the pit depth pd is 70 nm and the characteristic curve 60D shows a case wherein the wall surface angle θ is approx. 30 degrees and the pit depth pd is 70 nm. Further, the characteristic curve 60E shows a case wherein the wall surface angle θ is approx. 30 degrees and the pit depth pd is 30 nm. According to the characteristic curves 60A to 60E, the characteristic curve is shifted more in the left direction in the graph as the pit depth pd is increased if the wall surface angle θ is kept unchanged. Further, the characteristic curve is shifted more in the left direction in the graph with the characteristic curve 60A of the rectangular case set as a reference as the wall surface angle θ becomes smaller if the pit depth pd is kept unchanged. Therefore, in the pit structure shown in FIG. 3, the characteristic curve of a pit having the wall surface angle θ of not less than 30 degrees (not more than 90 degrees) and the pit depth of 90 nm or less varies in a range between the characteristic curves 60A and 60B which is indicated by a hatched portion in FIG. 6.

Figure 10:
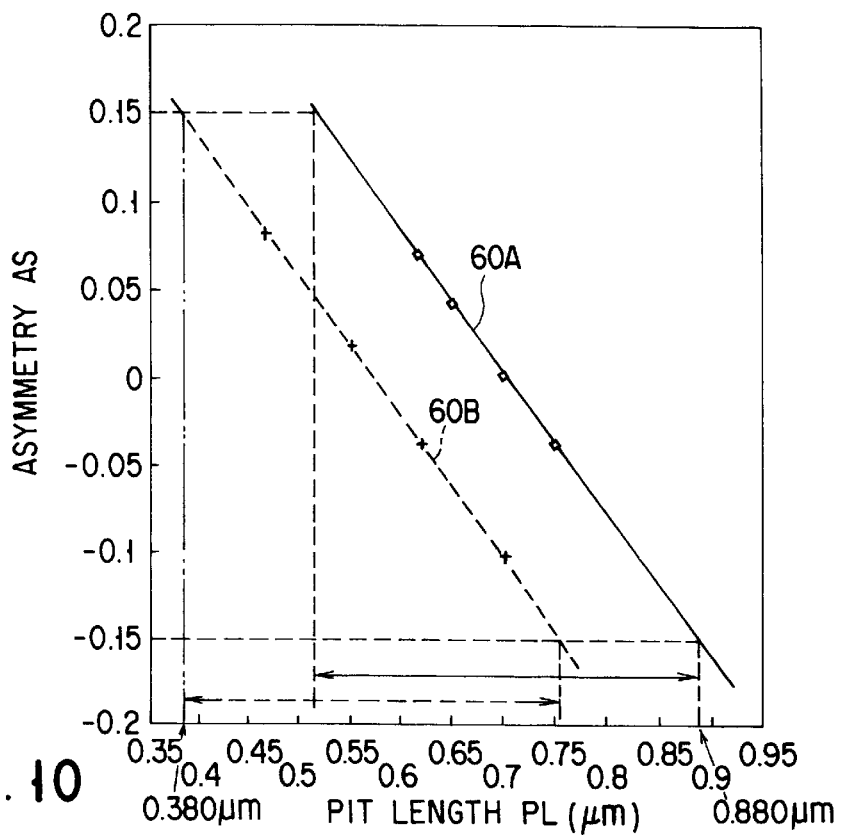
FIG. 10 is a characteristic diagram showing the relation between the asymmetry and the pit length associated with this embodiment.

In a case where a pit is formed on the optical disk, it is realistic to form a pit having the wall surface angle θ equal to or larger than approx. 30 degrees (not more than 90 degrees) and the pit depth pd of 90 nm or less in the above reproduction optical system when taking it into consideration that the amplitude of the difference signal becomes maximum at the optical depth of λ/8 and becomes minimum at the depth of λ/4. In the case of a cross section approximately equal to the rectangular cross section, it is considered to set the pit depth pd deep to a value approximately equal to 3λ/8 or 5λ/8, and to not less than 90 nm but this is not substantially different from that in not more than 90 nm. Therefore, in this embodiment, the characteristic curve set in the range of hatched portion shown in FIG. 6 is assumed for the pit shape which can be practically considered and the pit length PL for the desired asymmetry AS is set. That is, the desired asymmetry AS is preferably set in the range of "–0.15 to 0.15" as described before. Therefore, as is clearly seen from FIG. 6, it is necessary to control the pit length PL in the range of "0.380 μm to 0.880 μm". FIG. 10 shows the pit length PL corresponding to the range of "–0.15 to 0.15" of the asymmetry AS for the respective characteristic curves 60A, 60B.

In a case where the relation between the pit length PL in the track tangential direction of the pre-pit 1 and the asymmetry AS of the push-pull signal obtained at the time of reproduction by the optical head 13 is set, the pit string is indicated by a single frequency signal having the pit pitch PP of 1.23 μm as shown in FIG. 8 and the pit scanning linear velocity is set to S [m/s], then the reproduction signal frequency f [1/s] of the single frequency signal is expressed by the following equation (2):

$$f=S/1.23\times10^{-6}\ [1/s] \quad (2)$$

Therefore, the operation for controlling the pit length PL in the range of "0.380 μm to 0.880 μm" is equivalent to the operation for controlling the pit length according to the following expression (3):

$$0.618 \leq (2 \cdot f \cdot PL)/S \leq 1.43 \quad (3)$$

Figure 11:
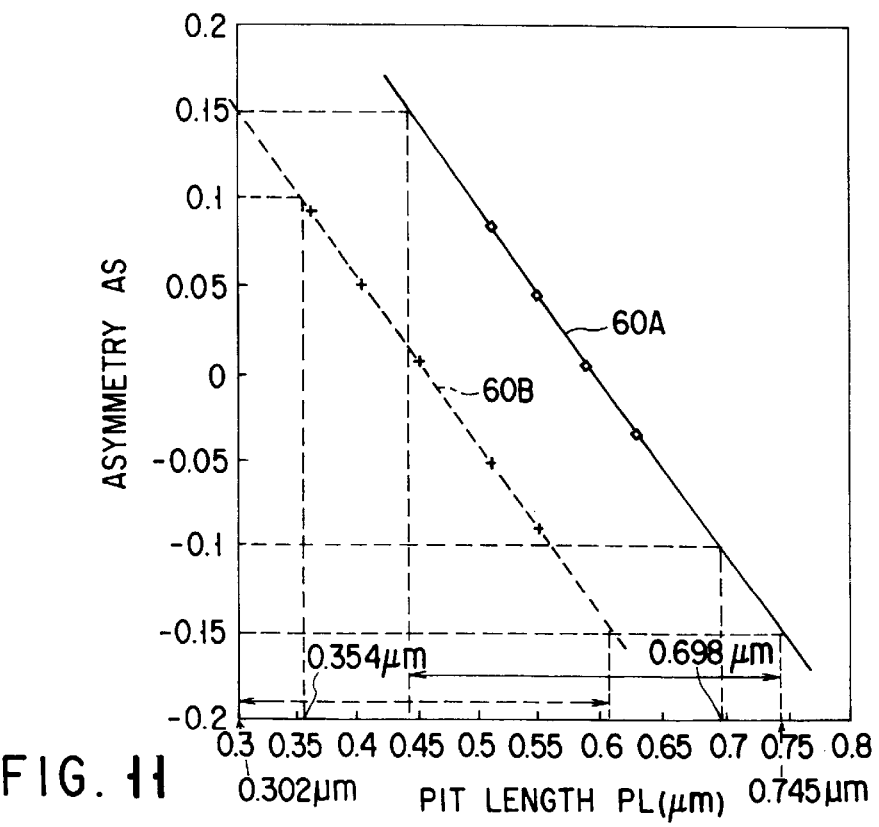
FIG. 11 is a characteristic diagram showing the relation between the asymmetry and the pit length associated with this embodiment.

Further, in a case where the signal of the shortest length of pit and space is treated as a pit string having the pit pitch PP of 1.02 μm, the characteristic curves shown in FIG. 11 are obtained as the characteristic curves 60A, 60B of the pit length PL with respect to the asymmetry AS. In this case, it is clearly understood from the drawing that the range of the pit length PL for the range of "–0.15 to 0.15" of the asymmetry AS becomes "0.302 μm to 0.745 μm". Therefore, if the calculation which is the same as that made when the pit pitch PP is 1.23 μm is made, the control operation equivalent to the operation for controlling the pit length PL based on the following expression (4) can be attained.

$$0.592 \leq (2 \cdot f \cdot PL)/S \leq 1.46 \quad (4)$$

because $$f = S/(1.02 \times 10^{-6})$$

Based on the above tendency, in order to set the asymmetry AS to a preferable degree in a case where the actual pit shape is assumed (including a case wherein the wall surface angle θ is equal to or larger than approx. 30 degrees and equal to or smaller than 90 degrees and the depth pd is not larger than 90 nm or a case wherein the depth pd is equal to or larger than 90 nm when the wall surface angle θ is near to 90 degrees), it is desirable to set the pit length PLn of a pit whose length corresponds to the code length nT so as to satisfy the following expression (5) when a preset reproduction frequency of a 2nT-pitch signal in the radius r1 in which the pit is reproduced is set to fnT [1/s} and the scanning linear velocity in the radius r1 is set to Sr1 [m/s].

$$0.55 \leq (2 \cdot fnT \cdot PLn)/Sr1 \leq 1.50 \quad (5)$$

The pit length PL which satisfies the following expression (6) instead of the expression (5) may be used. That is, the pit length PL of the pit recorded in correspondence to the n-channel bit length is set to satisfy the following expression (6) when the channel bit rate for the scanning linear velocity Sr1 [m/s] is set to fT [b/s].

$$0.55 \leq (f_T \cdot PL)/(n \cdot Sr1) \leq 1.50 \quad (6)$$

In the above embodiment, the asymmetry AS is set within a range of –0.15 to 0.15. However, this may be limited within a range of –0.10 to 0.10 in accordance with the margin allocation in the system. In this case, (2·fnT·PLn)/Sr1) is set as follows. That is, the pit length PL is determined within a range of 0.445 μm to 0.827 μm for a single frequency signal having the pit pitch PP of 1.23 μm from FIG. 6. This range of the pit length corresponds to the following equation (7).

$$0.724 \leq (2 \cdot f \cdot PL)/S \leq 1.34 \quad (7)$$

Further, in a case where the signal of the shortest length of pit and space is treated as a pit string having the pit pitch PP of 1.02 μm, it is obvious from FIG. 11 that the range of the pit length PL for the range of the desirable asymmetry AS becomes "0.354 μm to 0.698 μm". Therefore, if the calculation which is the same as that made when the pit pitch PP is 1.23 μm is made, the control operation equivalent to the operation for controlling the pit length PL based on the following expression (8) can be attained.

$$0.694 \leq (2 \cdot f \cdot PL)/S \leq 1.37 \quad (8)$$

Based on the above tendency, in order to set the asymmetry AS within a range of –0.10 to 0.10 in a case where the actual pit shape is assumed, it is desirable to set the pit length PLn so as to satisfy the following expression (9).

$$0.65 \leq (2 \cdot fnT \cdot PLn)/Sr1 \leq 1.40 \quad (9)$$

The pit length PL which satisfies the following expression (10) instead of the expression (9) may be used.

$$0.65 \leq (f_T \cdot PL)/(n \cdot Sr1) \leq 1.40 \quad (10)$$

As described above, according to this embodiment, in the pit structure of the pre-pit array (pit arrangement shifted in right and left with respect to the track center as shown in FIG. 2) recorded in the header field of the optical disk, a push-pull signal of desired asymmetry AS can be attained by use of the two-segment split photo-detector by setting the pit length PL to satisfy the above expression (5), (6), (9) or (10), particularly for each pit of the signal of the shortest length of pit and space when the pit is reproduced by focusing the beam spot on a position which is offset by a preset amount from the center of the pit in the radial direction. Therefore, in the reproduction system for generating the push-pull signal by use of the two-segment split photo-detector and effecting the data reproducing operation based on the push-pull signal, a reproduction signal of high quality can be obtained. As a result, in a case where the land/groove recording system is used in the recording field, and the pre-pit array shown in FIG. 2 is used in the header field, a reproduction signal of high quality can be obtained from the header field. Thus, the data recording density can be enhanced by use of the land/groove recording system, and at the same time, the reproducing operation with high precision for reproducing various information items from the pre-pit pattern in the header field with high reliability can be attained.

Figure 12:
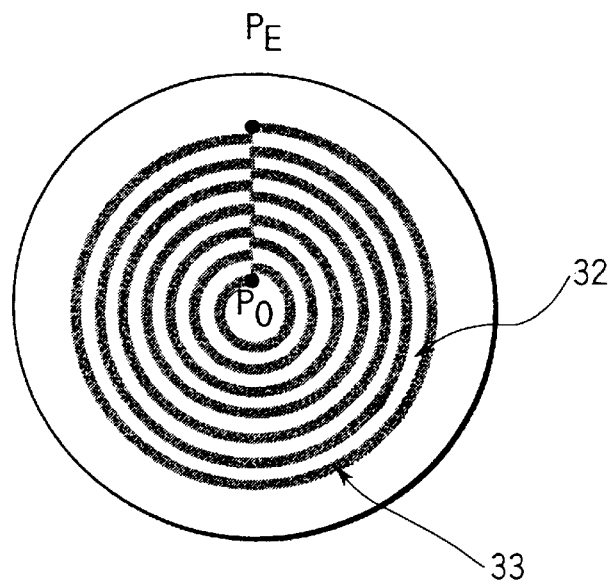
FIG. 12 is a plane view of an optical disk of a single spiral format.
Figure 13:
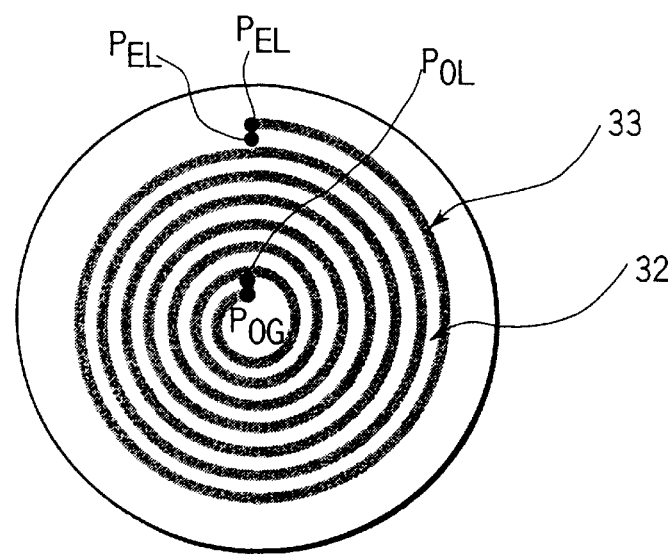
FIG. 13 is a plane view of an optical disk of a double spiral format.

FIGS. 12 and 13 show an optical disk of a single spiral format and an optical disk of a double spiral format, respectively. The single spiral format is a format wherein the land tracks 32 and groove tracks 33 are formed as a single spiral track from its start point P0 to its end point PE. The double spiral format is a format wherein the land track 32 and groove track 33 are formed as two parallel spiral tracks. In this double spiral format, there are two start points P0G and P0L and two end points PEG and PEL.

Figure 14:
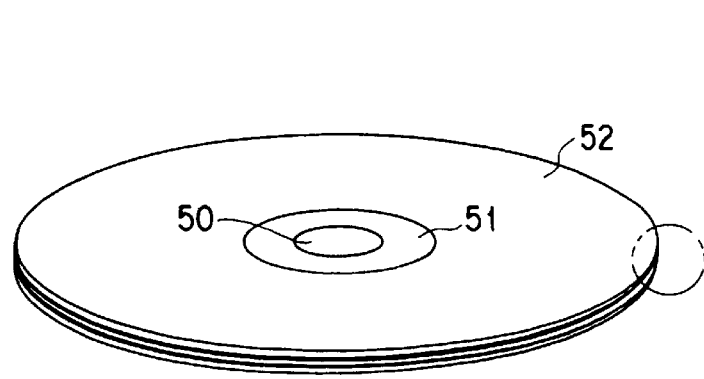
FIGS. 14 and 14A are perspective views of a double-sided disk.
Figure 14A:
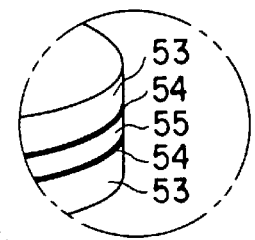

The optical disk 10 is constructed by a double-sided disk as shown in FIGS. 14 and 14A. More specifically, the optical disk comprises two recording layers 54 adhered to each other by a adhesive layer between two substrates 53. The optical disk has a center hole 50 around which a clamp area 51 and readout area 52 are provided. The pre-pit 31, the land 32 and groove 33 are formed on the recording layer 54 of the optical disk as shown in FIG. 2.

The above embodiment provides an optical disk on which the pits are formed. However, the marks may be formed on the optical disk instead of the pits.

As is described above in detail, according to this invention, in the rewritable optical disk apparatus using the land/groove recording system, the pit structure which permits a push-pull signal of desired asymmetry AS to be obtained can be attained, particularly, in a case where a reproduction system using the push-pull signal obtained by the two-segment split photo-detector to reproduce data from the pre-pit array of the header field used. Therefore, particularly, when various information items are reproduced from the pre-pit pattern in the header field, a reproduction signal of high quality can be obtained and the reproducing operation of high reliability can be attained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk apparatus comprising:
   an optical disk on which marks corresponding to bit data are arranged in a track tangential direction;
   a rotating unit configured to rotate said optical disk; and
   a reproducing unit configured to reproduce said marks, said reproducing unit including an emitting member configured to emit a light beam spot having a maximum light intensity at a position having a given offset in a radius with respect to a center of each of said marks, to detect said marks on said optical disk,
   wherein a length PL of each of said marks is set at such a value as to satisfy a condition of the following equation:

$$0.55 \leq (f_T \cdot PL)/(n \cdot Sr1) \leq 1.50$$

where a scanning linear velocity at which said optical disk is rotated by said rotating unit when said reproducing unit reproduces said marks recorded in the radius r1 of said optical disk is set to Sr1 [m/s], a preset channel bit rate in the radius r1 of said optical disk is set to $f_T$ [b/s], said marks correspond to data recorded in correspondence to the n-channel bit length, and the pit length measured in said track tangential direction is set to PL [m].

2. The optical disk apparatus according to claim 1, wherein the marks are pits recorded in the optical disk in the radius r1, the PL[m] indicates the length of each of the pits measured in the tangential direction of the track at a depth pd/2 where pd indicates a depth of a deepest portion of the pits.

3. The optical disk apparatus according to claim 2, wherein the pits each have a trapezoidal cross section.

4. The optical disk apparatus according to claim 2, wherein the pits having the trapezoidal cross section have a wall surface inclined by 30 to 75 degrees with respect to the track tangential direction and a depth of 30 nm to 90 nm.

5. The optical disk apparatus according to claim 2, wherein the pits have a rectangular cross section.

6. The optical disk apparatus according to claim 1, wherein n in the equation is defined as 4.

7. The optical disk apparatus according to claim 1, wherein said reproducing unit further includes:
   a two-segment split photo-detector having a separator parallel to said track tangential direction to detect said marks by means of said light beam spot; and
   a reproducing device configured to reproduce the data on the basis of a difference signal from said two-segment split photo-detector.

8. An optical disk apparatus comprising:
   an optical disk on which pits corresponding to bit data are preformed;
   a rotating unit configured to rotate said optical disk;
   a reproducing unit including a two-segment split photo-detector having a separator parallel to a track tangential direction to detect said pits by a reflected light obtained by emitting a light beam spot exhibiting a maximum light intensity peak at a position having a given offset in a radius with respect to a center of each of said pits, and reproducing data on the basis of a differential signal from said two-segment split photo-detector,
   wherein a length of each of said pits is set at such a value as to satisfy a condition of the following equation:

$$0.55 \leq (2 \cdot f_{nT} \cdot PLn)/Sr1 \leq 1.50$$

wherein PLn[m] indicates said length of each of the pits which is measured in said track tangential direction at a depth pd/2 in a condition that a depth of a deepest portion of each of said pits recorded in said optical disk at a radius r1 of said optical disk is pd, and with a length corresponding to a code length nT in a predetermined modulation method, and $f_{nT}$[1/s] is a predetermined reproducing frequency of a 2nT pitch signal in said radius r1, and Sr1 [m/s] is a scanning linear velocity of said optical disk in said radius.

9. The optical disk apparatus according to claim 8, wherein said reproducing unit includes a light emitting element configured to emit said light beam spot to said optical disk to detect the pits thereon, and a reproducing device configured to reproduce the data on the basis of the differential signal from the two-segment split photo-detector.

10. An optical disk on which a number of marks corresponding to bits data to be reproduced by a light beam spot emitted from a reproducing unit are arrayed along a track tangential direction, said light beam spot having a maximum light intensity at a position having a given offset in a radius with respect to a center of each of said marks, wherein a length PL of each of the marks is set at such a value as to satisfy a condition of the following equation:

$$0.55 \leq (f_T \cdot PL)/(n \cdot Sr1) \leq 1.50$$

where a scanning linear velocity at which said optical disk is rotated by a rotating unit when said reproducing unit reproduces said marks recorded in a radius r1 of said optical disk is set to Sr1 [m/s], a preset channel bit rate in said radius r1 of said optical disk is set to $f_T$ [b/s], said marks correspond to data recorded in correspondence to the n-channel bit length, and said length, and said length of each of said marks measured in said track tangential direction is set to PL [m].

11. The optical disk according to claim 10, wherein the marks are formed of pits, and PL[m] indicates the length of each of the bits measured in a track tangential direction at a depth of pd/2 where pd indicates a depth of a deepest portion of each of the pits.

12. The optical disk according to claim 11, wherein the pits each have a trapezoidal cross section.

13. The optical disk according to claim 12, wherein the pits each have a wall surface inclined by 30 to 75 degrees with respect to the track tangential direction and a depth of 30 nm to 90 nm.

14. The optical disk according to claim 10, wherein the marks are formed of pits each having a rectangular cross section.

15. The optical disk according to claim 10, wherein n in the equation is defined as 4.

16. The optical disk according to claim 10, wherein said reproducing unit includes
    a two-segment split photo-detector having a separator parallel to said track tangential direction to detect said marks by means of said light beam spot; and a reproducing device configured to reproduce the data on the basis of a difference signal from said two-segment split photo-detector.

17. An optical disk on which a number of pits corresponding to bit data to be reproduced by a light beam spot emitted from a reproducing unit having a two-segment split photo-detector and which is rotated by a rotating unit, said light beam spot having a maximum light intensity at a position having a given offset in a radius with respect to a center of each of the pits, and reproducing data on the basis of a differential signal from said two-segment split photo-detector, wherein a length of each of the pits is set at such a value as to satisfy a condition of the following equation:

$$0.55 \leq (2 \cdot f_{nT} \cdot PLn)/Sr1 \leq 1.50$$

where said length of each of the pits measured in said track tangential direction is PLn[m] at a depth pd/2 in a condition that a depth of a deepest portion of each of the pits recorded in the optical disk at the radius r1 of the optical disk and with a length corresponding to the code length nT in a predetermined modulation method is pd, a predetermined reproducing frequency of a 2nT pitch signal in the radius r1 is fnT[1/s], and a scanning linear velocity of the optical disk in the radius r1 is Sr1 [m/s].

18. An optical disk apparatus, comprising:

an optical disk on which marks corresponding to bit data are arranged in a track tangent direction;

a rotating unit configured to rotate said optical disk; and a reproducing unit configured to reproduce said marks, said reproducing unit including an emitting member configured to emit a light beam spot having a maximum light intensity at a position having a given offset in a radius with respect to a center of each of said marks, to detect the marks on the optical disk, wherein a length of each of said marks is set at such a value as to satisfy a condition of the following equation:

$$0.65 \leq (f_T \cdot PL)/(n \cdot Sr1) \leq 1.40$$

where a scanning linear velocity at which said optical disk is rotated by said rotating unit when said reproducing unit reproduces said marks recorded in a radius r1 of said optical disk is set to Sr1 [m/s], a preset channel bit rate in said radius r1 of said optical disk is set to $f_T$ [b/s], said marks correspond to data recorded in correspondence to the n-channel bit length, and said length of each of said marks measured in said track tangential direction is set to PL[m].

19. An optical disk apparatus comprising:

an optical disk on which pits corresponding to bit data are preformed;

a rotating unit configured to rotate said optical disk;

a reproducing unit including a two-segment split photo-detector having a separator parallel to a track tangential direction to detect said pits by a reflected light obtained by emitting a light beam spot exhibiting a maximum light intensity peak at a position having a given offset in a radius with respect to a center of each of said pits, for reproducing data on the basis of a differential signal from said two-segment split photo-detector, wherein a length PLn of each of the pits is set at such a value as to satisfy a condition of the following equation:

$$0.65 \leq (2 \cdot f_{nT} \cdot PLn)/Sr1 \leq 1.40$$

where said length of each of said pits measured in a track tangential direction is PLn[m] at a depth pd/2 in a condition that a depth of a deepest portion of each of said pits recorded in said optical disk at a radius r1 of said optical disk, and with a length corresponding to a code length nT in a predetermined modulation scheme is pd, a predetermined reproducing frequency of a 2nT pitch signal in the radius r1 is fnT[1/s], and a scanning linear velocity of the optical disk in the radius r1 is Sr1 [m/s].

20. An optical disk on which there are a number of pits corresponding to bit data to be reproduced by a light beam spot emitted from a reproducing unit, said light beam spot having maximum light intensity at a position having a given offset in a radial direction with respect to a center of each of the pits to detect the pits on the optical disk, and which is rotated by a rotating unit, wherein a length of each of the pits is set at a such a value as to satisfy a condition of the following equation:

$$0.65 \leq (2 \cdot f_{nT} \cdot PLn)/Srl \leq 1.40$$

where PLn[m] indicates the length of each of the pits measured in a track tangential direction at a depth pd/2 in a condition that a depth of a deepest portion of each of the pits recorded in the optical disk at the radius r1 of the optical disk and with a length corresponding to the code length nT in a predetermined modulation method is pd, a predetermined reproducing frequency fnT[1/s] of a 2nT pitch signal in the radius r1, and the scanning linear velocity of the optical disk in the radius r1 is Sr1 [m/s].

21. An optical disk on which there are a number of pits corresponding to bit data to be reproduced by a light beam spot emitted from a reproducing unit, said light beam spot exhibiting a maximum light intensity peak at a position having a given offset in a radius with respect to a center of each of said pits and reproducing data based on a differential signal from a two-segment split photo-detector that is included in said reproducing unit and has a separator parallel to a track tangential direction;

wherein a length PLn of each of the pits is set at such a value as to satisfy a condition of the following equation:

$$0.65 \leq (2 \cdot f_{nT} \cdot PLn)/Srl \leq 1.40$$

where said length of each of the pits measured in said track tangential direction is PLn[m] at a depth pd/2 in a condition that a depth of a deepest portion of each of said pits recorded in the optical disk at the radius r1 of the optical disk, and with a length corresponding to a code length nT in a predetermined modulation scheme is pd, a predetermined reproducing frequency of a 2nT pitch signal in the radius r1 is fnT[1/s], and a scanning linear velocity of the optical disk in the radius r1 is Sr1 [m/s].

* * * * *